United States Patent [19]

Dillenburg et al.

[11] 4,179,394
[45] Dec. 18, 1979

[54] PROCESS FOR IMPROVING THE STORAGE STABILITY OF ALKALI PERSALTS

[75] Inventors: Helmut Dillenburg, Rheinbrohl; Werner Doetsch, B. Hoenningen; Rudolf Siegel, Neuwied, all of Fed. Rep. of Germany

[73] Assignee: Peroxid-Chemie GmbH, Hoellriegelskreuth, Fed. Rep. of Germany

[21] Appl. No.: 868,311

[22] Filed: Jan. 10, 1978

[30] Foreign Application Priority Data

Jan. 11, 1977 [DE] Fed. Rep. of Germany ....... 2700797

[51] Int. Cl.$^2$ ..................... C11D 3/395; C11D 7/54; C11D 7/18
[52] U.S. Cl. .......................... 252/186; 8/110; 8/111; 252/95; 252/99; 252/102; 423/415 P; 423/513
[58] Field of Search .................. 252/186, 95, 99, 102; 8/111, 110; 423/415 P, 513

[56] References Cited

U.S. PATENT DOCUMENTS

| | | | |
|---|---|---|---|
| 3,979,313 | 9/1976 | Nakagawa et al. | 423/513 |
| 3,979,318 | 9/1979 | Tokiwa et al. | 252/186 |
| 4,008,167 | 2/1977 | Nakagawa et al. | 252/186 |
| 4,025,609 | 5/1977 | Matsunaga | 252/186 |

FOREIGN PATENT DOCUMENTS

| | | | |
|---|---|---|---|
| 741611 | 5/1970 | Belgium | 423/415 P |
| 1300525 | 8/1969 | Fed. Rep. of Germany | 423/513 |
| 46-38406 | 12/1971 | Japan | 423/513 |
| 51-106805 | 3/1976 | Japan | 423/415 P |
| 549841 | 12/1942 | United Kingdom | 423/415 P |

*Primary Examiner*—Benjamin R. Padgett
*Assistant Examiner*—Irwin Gluck
*Attorney, Agent, or Firm*—Schwartz, Jeffery, Schwaab, Mack, Blumenthal & Koch

[57] ABSTRACT

A process for improving the storage behavior of alkali persalts in particularly alkali percarbonates, by preparing a granulate composition therefore is disclosed. The process comprises the steps of:

(a) granulating an alkali persalt, wherein the alkali cation is an alkali metal cation or ammonium and which is selected from the group consisting of solid addition-products of an alkali salt with hydrogen peroxide and alkali salts of peroxo-acids in the presence of a sodium phosphate which is selected of sodium polyphosphates and sodium phyrophosphate and of water, and (b) drying the resulting granulate.

22 Claims, No Drawings

4,179,394

PROCESS FOR IMPROVING THE STORAGE STABILITY OF ALKALI PERSALTS

BACKGROUND OF THE INVENTION

It is an experience that alkali persalts in particular alkali carbonate peroxy hydrates (percarbonates), which are used to a large extent in detergents, tend to cake when they are stored for a longer period of time. Because of this caking tendency a hardening of the material and connected therewith a lump formation can occur, whereby the handling is rendered more difficult. Under unfavorable conditions the caking can lead, in extreme cases, to lumping of the material in sacks or silo assemblies in such a manner that a transportation by the usual load-carrying equipment is no longer possible.

SUMMARY OF THE INVENTION

It is an object of the present invention to provide a process for improving the storage behavior, in particular the storage behavior in silos, of alkali persalts, in particular alkali percarbonates. It is a further object of the present invention to provide a formulation of alkali persalts, in particular alkali percarbonates and alkali peroxodisulfate wherein the above mentioned disadvantages are avoided.

It is a further object of the present invention to provide such formulations which are free flowing and wherein the storage stability is improved and especially the original capability of free flowing is retained during even long storage periods.

It is a further object of the present invention to provide such a formulation wherein the tendency for dust formation is eliminated.

It is a further object of the present invention to provide such a formulation wherein the dissolution rate is increased.

In order to accomplish the foregoing objects according to the present invention there is provided a process for improving the storage behavior of alkali persalts, in particular alkali percarbonate, and alkali peroxodisulfate by preparing a granulate formulation thereof which comprises the steps of (a) granulating an alkali persalt, wherein the alkali cation is an alkali metal cation or ammonium and which is selected from the group consisting of solid addition-products of an alkali salt with hydrogen peroxide and alkali salts of peroxo-acids in the presence of a sodium phosphate which is selected from the group consisting of sodium polyphosphate and sodium pyrophosphate and of water, and (b) drying the resulting granulate.

The process is particularly suited for improving the storage behavior of mineral alkali persalts, e.g., addition products of hydrogen peroxide with alkali carbonates which are known as alkalipercarbonates or alkali carbonate peroxy hydrates, or alkali salts of mineral peroxy-acids such as peroxidisulfates.

According to the present invention there are further provided storage stable granulate formulations comprising an alkali persalt, wherein the alkali cation is an alkali metal cation or ammonium and which is selected from the group consisting of solid addition-products of an alkali salt with hydrogen peroxide and alkali salts of peroxo-acids and a fully hydrated sodium phosphate which is derived from a sodium phosphate selected from the group consisting of sodium polyphosphates and sodium pyrophosphate.

According to the present invention there are further provided detergent compositions comprising a surface active agent and the above defined granulate.

Further objects, features, and advantages of the present invention will become apparent from the detailed description of the invention and its preferred embodiments which follows.

DETAILED DESCRIPTION OF PREFERRED EMBODIMENTS

It has been found that granulates of alkali persalts, in particular alkali percarbonates, which are prepared according to the present invention exhibit an excellent storage behavior. Even during storage of the granulates over a period of several weeks or months in sacks of various sizes or in stationary or movable silos and containers under the most varified storage conditions, no caking of the granulate is observed, and the granulates retain their original ability of free flowing.

Furthermore the granulates according to the present invention exhibit the following advantageous properties:

Surprisingly the granulates exhibit a substantially increased abrasion resistance as compared with the starting materials per se. Due to this improved abrasion resistance, any troublesome dust formation during the handling of the material is avoided.

The granulates possess an increased dissolution rate as compared with the alkali persalt, e.g., the alkali percarbonate, as such.

The bleaching activity of a detergent composition containing a percarbonate in form of the granulated according to the present invention, e.g., the bleaching activity of a washing liquid containing such a detergent composition, is improved at lower temperatures.

The bulk density of the granulate can easily be adjusted to that of the other components of a detergent composition, whereby the storage stability of such a detergent composition is enhanced.

The grain size distribution in granulates can be readily altered to comply with the needs of various manufacturers of detergent compositions. Detergent compositions can be prepared wherein the components are homogenously mixed and do not seperate during a storage period.

The process according to the present invention is suited for improving the storage behavior of alkali persalts. The alkali cation of the alkali persalts comprises ammonium and alkali metal cations. Preferably the sodium cation. The term "alkali persalts" as used in the present specification and claims is meant to denote solid addition compounds of hydrogen peroxide and an alkali salt, such as alkali percarbonates (=alkali carbonate peroxyhydrates) and alkali salts of peroxy acids, in particular mineral peroxy-acids, e.g., alkali-peroxodisulfates. The process according to the present invention is especially suited for improving the storage behavior of alkali percarbonates, in particular sodium percarbonate.

For carrying out the process according to the present invention the solid alkali persalt, in particular sodium percarbonate, and sodium polyphosphates and/or pyrophosphates are mixed with water in a conventional granulating mixer and the resulting granulates are dried.

Any sodium phosphates which are capable of binding water can be used, e.g., commercially available sodium polyphosphates, and preferably sodium tripolyphosphate or pyrophosphates. These sodium phosphates preferably are utilized in the anhydrous state.

The by weight ratio between the phosphate and the solid alkali persalt may vary considerably depending on the chemical and physical properties of the alkali persalt, the type of phosphate and its degree of hydration as well as the desired physical properties and the intended use of the final products. For example, in the manufacture of detergent compositions, a by weight ratio between a solid alkali percarbonate and the phosphate of from about 1:0.1 to about 1:1, preferably from about 1:0.2 to about 1:0.4 is advisable. It is advisable that the amount of water which is present during the granulation should not substantially exeed the amount which is required to transform the phosphates into the fully hydrated state, that is into phosphates wherein the highest possible number of water molecules is bound as hydration water. Thus, on the one hand a good granulation is achieved, yet on the other hand drying expenses are kept low.

It is particularly advisable to use the freshly produced alkali persalts which are still moist in carrying out, the granulation process according to the present invention.

An addition of any granulating adjuvants is not absolutely necessary, yet adding a granulating adjuvant might be advisable, if only a low amount of phosphates is used and/or the alkali persalt, in particular the alkali percarbonate, comprises a major portion of fine grained particles. In such a case it is recommendable to utilize granulating adjuvants, which simultaneously have a stabilizing effect on the active oxygen content of the alkali persalt. Such agents are well known in the art. Suitable such agents are sodium silicates, e.g., aqueous waterglass solutions, magnesium sulfate hexametaphosphates and others.

Furthermore, if desired, various conventional additives for detergent compositions may be incorporated into the granulates according to the present invention. For example, further to the alkali persalts, in particular the alkali percarbonates, and the sodium phosphates conventional builders may be incorporated in the granulates. Examples of suitable such additives are sodium trinitrilo acetate, citric acid, zeolite, gluconic acid, alkali orthophosphates, water soluble salts of carboxylic and sulfocarboxylic acids, ethylene diamine tetra acetic acid, polyalkylene-polyamine-N-polycarboxylic acids, mixed polymers or copolymers of an unsaturated aliphatic polycarboxylic acid with an alkylene or with an unsaturated monocarboxylic acid and phosphonic acids. Granulates according to the present invention which additionally contain any of the aforesaid additives also possess the above mentioned advantageous properties. For preparing such granulates it also is not absolutely necessary to add granulating adjuvants, but such adjuvants may be added if desired.

By varying the granulating conditions, for example, the period of time during which the material is kept in the granulator and the intensity of the granulating action, type and amount of the starting materials, amount of the water and optionally the granulating adjuvants, the physical properties of the final products can be varied within a broad range, to fit the intended use of the product. The higher the amount of liquids which are used in the process is, the coarser is the resulting granulate, whereby the upper limit of the amount of liquid is set by the well known fact that a too moist material can no longer be properly granulated. At the same time the bulk density increases.

The grain size distribution and the bulk density can also be influenced by varying the portion of coarse grained and heavy materials in the starting ingredients. It is evident, that the higher the amount of coarse and heavy starting ingredients in the granulate is, the higher the bulk density and the coarser the particles of the granulate will be. Usually, the coarse and heavy starting materials comprise the sodium percarbonate and the light components comprise the phosphates.

By adjusting the ratio between the amounts of starting material, granulates of a desired content in phosphate and in active oxygen can be prepared.

The drying of the granulates according to the present invention can be effected in conventional manners, for example at temperatures of from about 30° C. to about 70° C., e.g., in a fluidized bed dryer wherein the temperature of the material is maintained at from about 40° to about 55° C.

The granulates according to the present invention are preferably used in the manufacture of detergent compositions, e.g., washing powders. They are readily mixable with conventional surface active agents and optionally conventional additives for preparing detergent compositions.

The abrasion resistance of the granulates is determined as follows:

In a rotating cylinder of 5 mm in diameter which is rotating at a speed of 145 rotations per minute and which is half filled with lead balls, a sample of the granulate which previously has been passed through a sieve (mesh size DIN-30), is treated for 15 minutes. Subsequently it is again sieved.

The abrasion is defined as the resulting percent amount of fine grains (grain size less than 0.053 mm).

In this test, the granulates according to the present invention exhibit an abrasion of about 0.3–4%, whereas the starting compounds exhibit an abrasion of about 1–6%.

The dissolution rate is measured in the granulates by determining the content of active oxygen which is transfered into the solution during a chosen time-unit.

The storage stability of the laboratory samples which are produced according to the following working examples, is determined as follows:

The samples to be tested are stored at room temperature and 60% humidity in 6 open 250 ml plastic bottles which are filled up to ⅜; every tenth day the flow-behavoir is tested. On the first test day i.e. after ten days the first plastic bottle is evaluated. After another ten days, that is after 20 days, the second bottle and again the first bottle is evaluated, after 30 days the third bottle and bottles no. 1 and no. 2 are tested a.s.o. with reference to the following arbitary scale (flowability index):

10 free-flowing like dry sand;
9 free-flowing, yet at a slightly reduced flow-speed, the sample may be somewhat damp or farinaceous;
8 total emptying requires occasional shaking;
7 needs a strong blow to empty totally;
6 needs several blows to empty, one or more big lumps may occur;
5 needs many strong blows to empty;
4 does not empty, the product is soft, or hard, or lumpy;
3 does not empty, the product is generally too hard to be divided by means of a spatula.

The flow-behavoir of the sixth bottle, the sample which is moved for the first time after 60 days, is used as a standard for evaluation of the storage stability.

EXAMPLE 1

1800 g of moist sodium percarbonate (a freshly produced product which is used in the moist state directly after centrifuging it from an aqueous suspension, moisture content 14%), 900 g of sodium tripolyphosphate (tradename Superpurit, type 300 manufacturer Chem. Fabrik Budenheim, technically, coarse grain, dehydrated, $P_2O_5$-content about 57%, $Na_2O$-content about 42%, bulk density about 300 p/l) and 300 g of water are introduced into a stainless steel laboratory mixer having a net content of 10 liters (type M 20E, manufacturer Firma Loedige) and the mixture is agitated for 4 minutes, optionally under cooling, whereby the agitator speed is 350 rpm.

The resulting granulate is dried in a fluidized bed dryer at an upper bed temperature of from 40° to 55° C. Subsequently, the granulate is passed through a sieve (mesh size: DIN 5) and the resulting coarse material is separated. The thus obtained product exhibits the following properties:

| bulk density | p/l 960 |
| --- | --- |
| content in active oxygen | 5 8.24 |
| abrasion | % 0.3 |
| solubility after 1 minute | % 93.2 | grain size distribution:

| >0.840 | mm | % 34 |
| --- | --- | --- |
| <0.840->0.420 | mm | % 53.9 |
| <0.420->0.149 | mm | % 11.2 |
| <0.149->0.053 | mm | % 0.9 | storage stability after 60 days: 10

EXAMPLE 2

Following the procedure described in Example 1, 1800 g of a freshly centrifuged moist sodium percarbonate (moisture content 14%), 540 g of sodium percarbonate dust (0.053 mm), and 300 g of sodium tripolyphosphate are mixed with 75 g of a water glass solution (silicate content equivalent to 13% of $SiO_2$) and 50 ml of $H_2O$. The mixture is subsequently dried and sieved.

The resulting granulate exhibits the following properties:

| bulk density | p/l 890 |
| --- | --- |
| content in active oxygen | % 12.12 |
| abrasion | % 1 |
| solubility after 1 minute | % 93.5 | grain size distribution

| >0.840 | mm | % 35.8 |
| --- | --- | --- |
| <0.840->0.420 | mm | % 59.6 |
| <0.420->0.149 | mm | % 4.5 |
| <0.149->0.053 | mm | % 0.1 | storage stability after 60 days: 10

EXAMPLE 3

Following the procedure described in Example 1, 1800 g of freshly centrifuged moist sodium percarbonate (moisture content 14%) and 900 g of dehydrated sodium pyrophosphate are mixed with 100 g of a water glass solution (silicate content equivalent to 13% $SiO_2$) and 200 g of $H_2O$. The mixture is subsequently dried and sieved.

The obtained granulate exhibits the following properties:

| bulk density | p/l 830 |
| --- | --- |
| content in active oxygen | % 9.4 |
| solubility after 1 minute | % 100 |
| abrasion | % 4.2 | grain size distribution

| >0.840 | mm | % 2.0 |
| --- | --- | --- |
| <0.840->0.420 | mm | % 62.0 |
| <0.420->0.149 | mm | % 34.8 |
| <0.149->0.053 | mm | % 1.2 | storage stability after 60 days: 10

EXAMPLE 4

2850 kg of sodium percarbonate are granulated with 2150 kg of sodium tripolyphosphate, while adding a total amount of 1150 l of water in a screw granulator of 4 m length turning at a speed of 27 rpm at a flow rate of 7 tons per hour. The resulting granulate is dried in a conventional fluidized bed dryer whereby the temperature of the material is maintained at 55° C. and the resulting granulate is then stored in a conventional concrete silo having the following dimensions: lateral length 1.5 m, cone angle 70°, wall thickness 12 cm.

After 60 days of storage, the obtained material is free-flowing and without lumps.

EXAMPLE 5

Following the procedure described in Example 1, 1350 g of freshly centrifuged moist sodium percarbonate (14% moisture) and 450 g each of zeolite and of sodium triployphosphate are mixed with 35 g of a sodium water glass solution (silicate content equivalent to 13% $SiO_2$). The mixture is dried and sieved.

The obtained granulate exhibits the following properties:

| bulk density | p/l 650 |
| --- | --- |
| content in active oxygen | % 6.0 |
| abrasion | % 4.4 |
| solubility after 1 minute | % 93.3 | grain size distribution

| >0.840 | mm | % 3.7 |
| --- | --- | --- |
| <0.840->0.420 | mm | % 64.1 |
| <0.420->0.149 | mm | % 25.5 |
| <0.149->0.053 | mm | % 5.9 |
| >0.053 | mm | % 0.8 | storage stability after 60 days: 10

What is claimed is:

1. A process for preparing a storage-stable granulate formulation of alkali persalts which comprises the steps of
   (a) granulating a solid alkali persalt, wherein the alkali cation is an alkali metal cation or ammonium and which is selected from the group consisting of solid addition-products of an alkali salt with hydrogen-peroxide and alkali salts of peroxo-acids in the presence of a sodium phosphate which is selected from the group consisting of sodium polyphosphates and sodium pyrophosphate and of water to obtain a granulate comprising granulate particles containing fully hydrated sodium phosphate adhered to solid alkali persalt particles, and (b) drying the resulting granulate.

2. The process as defined in claim 1 wherein the alkali persalt is an alkali percarbonate.

3. The process as defined in claim 1 wherein the alkali persalt is an alkali peroxo disulfate.

4. The process as defined in claim 1 wherein the sodium polyphosphate is sodium tripolyphosphate.

5. The process as defined in claim 4 wherein the by weight ratio between the alkali percarbonate and the sodium tripoly phosphate is from about 1:0,1 to about 1:1.

6. The process as defined in claim 5 wherein the by weight ratio is from about 1:0,2 to about 1:0,4.

7. The process as defined in claim 1 wherein the granulating step further comprises adding a builder additive.

8. The process as defined in claim 7 wherein the builder additive is a zeolite.

9. The process as defined in claim 1 wherein the amount of water is about equivalent to the amount of water required to provide for the highest possible degree of hydration of the sodium phosphates.

10. The process as defined in claim 1 wherein the granulating step further comprises adding a granulating additive.

11. The process as defined in claim 1 wherein the drying step is effected at a temperature of from about 30° to about 70° C.

12. The process as defined in claim 11 wherein the drying step is effected in a fluidized bed dryer whereby the granulate is maintained at a temperature of from about 40° to about 55° C.

13. A storage stable granulate formulation of alkali persalts which comprises an alkali persalt wherein the alkali cation is an alkali metal cation or ammonium and which is selected from the group consisting of solid addition-products of an alkali salt with hydrogen peroxide and alkali salts of peroxo-acids and a fully hydrated sodium phosphate which is derived from a sodium phosphate selected from the group consisting of sodium polyphosphates and sodium pyrophosphate, which granulate formulation is obtained by the process as defined in claim 1.

14. The composition as defined in claim 13 wherein the alkali persalt is an alkali percarbonate.

15. The composition as defined in claim 13 wherein the alkali persalt is an alkali salt of an inorganic peroxo acid.

16. The composition as defined in claim 13 wherein the alkali persalt is an alkali peroxo disulfate.

17. The composition as defined in claim 13 wherein the sodium polyphosphate is sodium tripolyphosphate.

18. The composition as defined in claim 14 wherein the by weight ratio between the alkali percarbonate and the sodium phosphate is from about 1:0.1 to about 1:1.

19. The composition as defined in claim 18 wherein the by weight ratio is from about 1:0.2 to about 1:0.4.

20. The composition as defined in claim 13 which further comprises a builder additive.

21. The composition as defined in claim 20 wherein the builder additive is a zeolite.

22. A detergent composition comprising a surface active agent and the granulate as defined in claim 13.

* * * * *